W. P. GREGG.

ROLLER-SKATES.

No. 7,387. Reissued Nov. 7, 1876.

Witnesses.
Benj Hall Curtis
John J Kiner

Washington Parker Gregg

UNITED STATES PATENT OFFICE.

WASHINGTON PARKER GREGG, OF BOSTON, MASSACHUSETTS.

IMPROVEMENT IN ROLLER-SKATES.

Specification forming part of Letters Patent No. 48,929, dated July 25, 1865; reissue No. 5,707, dated December 23, 1873; reissue No. 7,387, dated November 7, 1876; application filed May 18, 1876.

*To all whom it may concern:*

Be it known that I, WASHINGTON PARKER GREGG, of Boston, in the county of Suffolk and State of Massachusetts, have invented new and useful Improvements in Roller-Skates; and I do hereby declare that the following description, with the accompanying drawings, forms a full, clear, and exact specification thereof.

My improvements consist in the novel construction of the roller-skate hereinafter described and claimed.

The accompanying drawings exhibit the stock or foot-rest and the rollers of a skate embodying my improvements.

Figure 1:
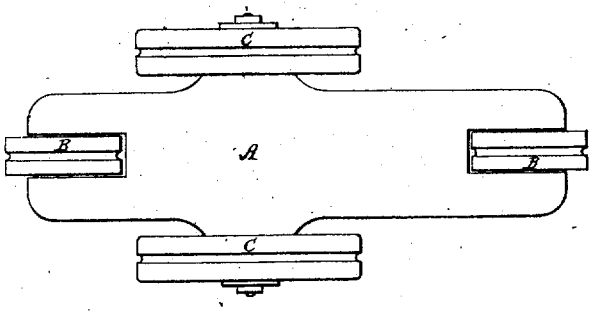
Figure 2:
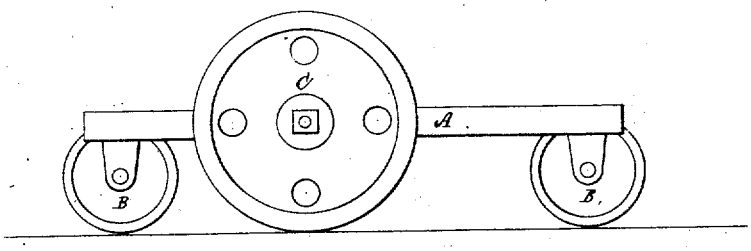
Figure 3:
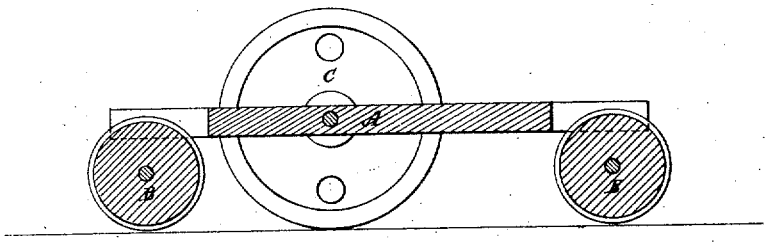
Figure 4:
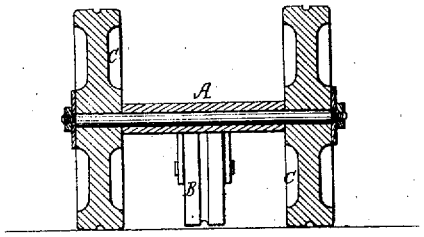

Of such drawings, Figure 1 exhibits the skate in top view, Fig. 2 in side elevation, Fig. 3 in longitudinal section, and Fig. 4 in transverse section.

In carrying out my invention, I make the stock or foot-rest A of the skate of metal, wood, or other suitable material or materials, and of any desirable form, and with any simple attachments for fastening it to the foot of a person, combining lightness, strength, and security. I arrange two comparatively small rollers, B B, for support, one partly under the heel, and the other partly under the toe of the stock; and I also arrange two comparatively large rollers, C C, for driving, one on each side of the stock or foot-rest, under the arch of the foot, near the line of gravity of the skater. I make the rollers, their axles, and connections or fastenings of metal or wood, or partly of both, solid or otherwise, securing strength, lightness, and durability. The size of the stock is adapted to the foot, and the size of the rollers may be varied according to the skill of the skater and the quality or state of the skating-surface. For common purposes the smaller rollers may be three inches in diameter and one inch in width on the periphery, and the larger rollers may be five inches in diameter and one inch in width on the periphery. The axles or journals of the side rollers project from the stock. These rollers enable the skate to run with greater ease and rapidity than it could by means of the heel and toe rollers alone. They are so arranged that their peripheries or the bearing-surfaces thereof shall be a little lower than those of the heel and toe rollers, in order that the skater may drive himself, while skating, almost entirely by the large rollers.

Roller-skates thus constructed run and turn with great ease and rapidity, and do not injuriously sprain the feet, nor weary the limbs, and they will not easily tip backward or forward, and they impart from the first an unusual feeling of security to the skater in all possible movements.

This skate is well adapted to hard sidewalks, large halls, gymnasiums, and skating-schools, and in suitable places for traveling purposes.

Having described my invention, what I claim is as follows:

A roller-skate constructed with a stock or foot-rest having a small supporting-roller under each end, and a larger driving-roller on each side, arranged outside of the foot-rest, and having the bearing-surface lower than the end rollers, substantially as described.

WASHINGTON PARKER GREGG.

Witnesses:

RICH. F. MURRAY,
J. H. CHANDLER.